United States Patent [19]

Takaiwa et al.

[11] Patent Number: 5,045,928
[45] Date of Patent: Sep. 3, 1991

[54] WHITE BALANCE CONTROL WITH CHOICE OF CONTROL DEPENDENT ON BRIGHTNESS

[75] Inventors: Kan Takaiwa, Tokyo; Kenji Kyuma; Teruo Hieda, both of Kanagawa, all of Japan

[73] Assignee: Canon Kabushiki Kaisha, Tokyo, Japan

[21] Appl. No.: 336,046

[22] Filed: Apr. 11, 1989

[30] Foreign Application Priority Data

Apr. 21, 1988 [JP] Japan ................................ 63-096916
Apr. 22, 1988 [JP] Japan ................................ 63-099635

[51] Int. Cl.$^5$ .............................................. H04N 9/73
[52] U.S. Cl. ...................................... 358/29 C; 358/41
[58] Field of Search ....................... 358/29, 31, 41, 43, 358/50, 75, 80, 228

[56] References Cited

U.S. PATENT DOCUMENTS

| | | | |
|---|---|---|---|
| 4,395,730 | 7/1983 | Shen ................................ | 358/29 C |
| 4,605,955 | 8/1986 | Hashimoto et al. ............... | 358/29 C |
| 4,635,126 | 1/1987 | Kinoshita ......................... | 358/228 |
| 4,727,413 | 2/1988 | Miura et al. ...................... | 358/29 C |
| 4,811,086 | 3/1989 | Hieda ............................... | 358/29 C |
| 4,823,185 | 4/1989 | Miyamoto et al. ............... | 358/29 C |
| 4,833,525 | 5/1989 | Suzuki et al. ..................... | 358/29 C |

FOREIGN PATENT DOCUMENTS 0006580 1/1987 Japan .

Primary Examiner—Howard W. Britton
Assistant Examiner—Kim Yen Vu
Attorney, Agent, or Firm—Robin, Blecker, Daley & Driscoll

[57] ABSTRACT

A white balance correction circuit includes a first correction signal forming circuit for forming a first white balance correction signal on the basis of an output of a colorimetric sensor, a second correction signal forming circuit for forming a second white balance correction signal on the basis of an output of a color image sensor, and a selection circuit for selecting one of the first and second control signals in accordance with a brightness or color saturation of an object to be photographed, so that the color image sensor produces an image signal having a white balance controlled in accordance with the first or second white balance correction signal selected by the selection circuit.

27 Claims, 7 Drawing Sheets

WHITE BALANCE CONTROL WITH CHOICE OF CONTROL DEPENDENT ON BRIGHTNESS

BACKGROUND OF THE INVENTION

1. Field of the Invention

This invention relates to a white balance correction circuit and more particularly to a white balance correction circuit adapted for image sensing apparatuses such as a color video camera, an electronic still camera, etc.

2. Description of the Related Art

The human eye has a color constancy which causes a red object to appear to be red and a white object to be white even in the event of a change occurred in the color of a light source. This is considered to be attributable to cancellation of the color of ambient light by the visual sensation information processing system of the brain. Meanwhile, the conventional color video camera has been arranged to measure the color of the light source and to remove the adverse effect of the measured color by varied methods (white balance correcting methods).

FIG. 1 of the accompanying drawings is a block diagram showing the arrangement of a color video camera which incorporates therein the conventional white balance correction circuit. An image of the object to be photographed is formed on an image sensor 12 through a photo-taking lens 10. The image sensor 12 then produces signals R, G and B. The output signals R and B of the image sensor 12 are supplied to a signal processing circuit 18 respectively via variable gain amplifiers 14 and 16 which are provided for white balance correction. The output signal G of the image sensor 12 is supplied directly to the signal processing circuit 18. The signal processing circuit 18 is arranged to produce a video signal by performing a known video signal processing operation on these inputs including clamping, gamma correcting and synchronizing signal adding processes.

The gains of the amplifiers 14 and 16 are controlled in the following manner: The ambient light around the camera is diffused by a diffusing plate 20 before it comes to a colorimetric sensor 22. The colorimetric sensor 22 is arranged to produce color signals Rm, Gm and Bm which represent the amounts of three primary color components, respectively. The outputs Rm, Gm and Bm of the colorimetric sensor 22 are logarithmically compressed by logarithmic compression circuits 24R, 24G and 24B, respectively. A subtracter 26 is arranged to subtract the output logGm of the logarithmic compression circuit 24G from the output logRm of the logarithmic compression circuit 24R. A subtracter 28 is arranged to subtract the output logGm of the logarithmic compression circuit 24G from the output logBm of the logarithmic compression circuit 24B. The gain of the amplifier 14 is controlled by the output log(Rm/Gm) of the subtracter 26. The gain of the amplifier 16 is controlled by the output log(Bm/Gm) of the subtracter 28. The white balance correction is thus controlled.

FIG. 2 shows another example of the conventional white balance correction arrangement. In this case, the outputs R, G and B of an image sensor 12 are integrated by integrating circuits 30R, 30G and 30B for one picture and are then logarithmically compressed by logarithmic compression circuits 32R, 32G and 32B. Like the above-stated subtracter 26, a subtracter 34 is arranged to subtract the output of the logarithmic compression circuit 32G from the output of the logarithmic compression circuit 32R. Like the subtracter 28, a subtracter 36 subtracts the output of the logarithmic compression circuit 32G from the output of the logarithmic compression circuit 32B. The gain of an amplifier 14 is controlled by the output of the subtracter 34. The gain of another amplifier 16 is controlled by the output of the subtracter 36.

The conventional color video camera which is arranged as shown in FIG. 1 is, however, incapable of making accurate white balance correction in cases where the object to be photographed and the diffusing plate 20 are illuminated by different light sources, where a picture of an outdoor scene is taken from the inside of a room or where the diffusing plate 20 is inadvertently blocked from light by a finger or the like.

In the case of FIG. 2, the conventional camera is based on the concept that an integrating action on the color of an object brings it close to a neutral gray color. However, there are some objects to which this concept is not applicable. For example, in a case where an object of a specific color is occupying a larger portion of the picture than other objects like in taking a picture of a person located in front of a red wall, accurate white balance correction is impossible by the camera of FIG. 2.

The conventional color video cameras described above thus have their advantages and disadvantages according to the conditions under which they are to be used. The conditions under which they are advantageously usable are limited.

FIG. 3 is a block diagram showing a further example of a color video camera which incorporates therein the conventional white balance correction circuit. The illustration includes an image sensor 110; a luminance and chromaticity forming circuit 112; white balance correction amplifiers 114 and 116; and an encoder 118. The encoder 118 is arranged to form a standard TV signal (of the NTSC system, for example) from a luminance signal output from the luminance and chromaticity forming circuit 112 and color difference signals which have been white-balance-corrected by the white balance correction amplifiers 114 and 116. A white balance correction signal forming circuit 122 is arranged to form white balance correction signals from the output of a color temperature sensor 120.

The operation of the color video camera of FIG. 3 is briefly described as follows: Light incident on the image sensor 110 is photo-electric converted. An electrical signal thus obtained is supplied to the luminance and chromaticity forming circuit 112. The luminance and chromaticity forming circuit 112 then outputs a luminance signal $Y_H$ to a signal line 112A; a low-band luminance signal $Y_L$ to a signal line 112B; a color-difference signal $(R - Y_L)$ to a signal line 112C; and a color-difference signal $(B - Y_L)$ to a signal line 112D. The color-difference signals of the signal lines 112C and 112D are respectively supplied to the white balance correction amplifiers 114 and 116.

The white balance correction signal forming circuit 122 forms white balance correction signals on the basis of the output of the color temperature sensor 120. In accordance with the white balance correction signals, the amplifiers 114 and 116 add or subtract the low-band luminance signal $Y_L$ of the signal line 112B to or from the color-difference signals supplied to them. As a result, the amplifiers 114 and 116 output white-balance-corrected color-difference signals, respectively.

The encoder 118 forms a standard TV signal from the luminance signal $Y_H$ output from the luminance and chromaticity forming circuit 112 and the white-balance-corrected color-difference signals $(R-Y_L)$ and $(B-Y_L)$ output from the amplifiers 114 and 116. The encoder 118 thus outputs the standard TV signal. However, since the example of the conventional color video camera of FIG. 3 has its white balance correction system arranged in an open loop, it is inferior in the absolute degree of accuracy.

To eliminate this shortcoming, another example of the conventional color video camera has a white balance correction system arranged in a closed loop as shown in FIG. 4. In FIG. 4, the same component parts as those of FIG. 3 are indicated by the same reference numerals as in FIG. 3. The example includes a white balance correction signal forming circuit 124 which corresponds to the white balance correction signal forming circuit 122 of FIG. 3. The conventional camera example differs from the camera of FIG. 3 in that the white balance correction signals are formed with reference to the outputs of the amplifiers 114 and 116.

The color video camera of FIG. 4 operates as follows: The luminance and chromaticity forming circuit 112 is arranged like the camera of FIG. 3 to output the luminance signals $Y_H$ and $Y_L$ and the color-difference signals $(R-Y_L)$ and $(B-Y_L)$. The color-difference signals $(R-Y_L)$ and $(B-Y_L)$ are supplied respectively to the amplifiers 114 and 116. Like in the case of FIG. 3, the amplifiers 114 and 116 are arranged to respectively add or subtract the low-band luminance signal $Y_L$ to or from the color-difference signals $(R-Y_L)$ and $(B-Y_L)$ in accordance with white balance correction signals output from the white balance correction signal forming circuit 124. The amplifiers 114 and 116 thus output white-balance-corrected color-difference signals.

The white balance correction signal forming circuit 124 compares a mean value of each of the white-balance-corrected color-difference signals obtained by the amplifiers 114 and 116 with an achromatic color level of each of the color-difference signals. The circuit 124 then forms the white balance correction signals and supplies them to the amplifiers 114 and 116 in such a way as to make the levels of the color-difference signals equal to each other. The white balance correcting operation is thus performed in a closed loop.

The conventional color video camera of FIG. 4 is thus arranged to have the white balance correcting system operate with a high degree of accuracy on account of its closed loop arrangement. However, in a case where the color temperature (or spectral distribution) of an illumination light on the object is not reflected by the light incident upon the image sensor 110 like in the event of a monochromatic colored object, the camera makes a faulty white balance correction.

SUMMARY OF THE INVENTION

This invention is directed to the solution of the above-stated problems of the prior art. It is therefore a first object of the invention to provide a white balance correction circuit which is capable of always giving appropriate white balance under any conditions.

To attain this object, a white balance correction circuit which is arranged as a first embodiment of the invention comprises: first correction signal forming means for forming a white balance correction signal on the basis of an output of a colorimetric sensor; second correction signal forming means for forming a white balance correction signal on the basis of an output of image sensing means; and selection means for selecting one of the first and second correction signal forming means according to camera illuminance information obtained by the colorimetric sensor and object illuminance information obtained by the image sensing means.

Another white balance correction circuit which is arranged according to the invention as a second embodiment thereof comprises: image sensing means capable of selectively reading out color information on ambient light and color information on object light; correction signal forming means for forming a white balance correction signal on the basis of an output of the image sensing means; illuminance signal forming means for forming an illuminance signal on the basis of an output of the image sensing means; and selection means for selecting one of a white balance correction signal formed by the correction signal forming means on the basis of the color information on ambient light and a white balance correction signal formed by the correction signal forming means on the basis of the color information on object light in accordance with an illuminance signal formed by the illuminance signal forming means on the basis of the color information on ambient light and an illuminance signal formed by the illuminance signal forming means on the basis of the color information on object light.

Each of these embodiments is arranged to detect the ambient illuminance of the camera and the illuminance of the object from the output of the colorimetric sensor and that of the image sensor or another output of the image sensor which is obtained from a specific part of the image sensor; and to form white balance correction signals corresponding to these outputs respectively. One of the white balance correction signals is selected according to a difference between the two illuminance values thus detected. The weak points of these white balance correction signals thus can be respectively covered by this selection. As a result, the white balance correction always can be appropriately carried out.

A second object of the invention is to provide a white balance correction circuit which is capable of always appropriately carrying out white balance correction under any of such conditions that have caused the conventional white balance correction circuits to perform the faulty correcting actions as mentioned in the foregoing.

To attain the above-stated object, a white balance correction circuit which is arranged as a third embodiment of the invention comprises: correcting means for correcting a color signal in accordance with a white balance correction signal; computing means for forming a difference signal indicative of a difference of the color signal corrected by the correcting means from a predetermined level; color temperature detecting means for detecting a color temperature of ambient light; and white balance correction signal forming means for forming the white balance correction signal on the basis of an output of the color temperature detecting means when the difference signal formed by the computing means indicates that the difference is substantially zero and for forming the white balance correction signal on the basis of a computation result obtained by the computing means and an output of the color temperature detecting means when the difference signal formed by the computing means indicates that the difference is not substantially zero.

In the third embodiment, the color temperature of ambient light is detected by the color temperature detecting means; and the color signal on which a white balance correcting action is to be performed is, so to speak, determined as to whether it is monochromatic or not by the computing means. In a case where the signal is monochromatic, the white balance correction should be performed with reference to the object illuminating ambient light prior to other light. Therefore, in this case, the information to be used by the white balance correction signal forming means as the basis on which the white balance correction signal is formed is switched from one over to the other as mentioned in the foregoing. This arrangement enables the third embodiment to make white balance correction in a manner apposite to both the object light and the illumination light.

Other objects and features of the invention will become apparent from the following detailed description of embodiments thereof taken in connection with the accompanying drawings.

DETAILED DESCRIPTION OF THE PREFERRED EMBODIMENTS

Figure 1:
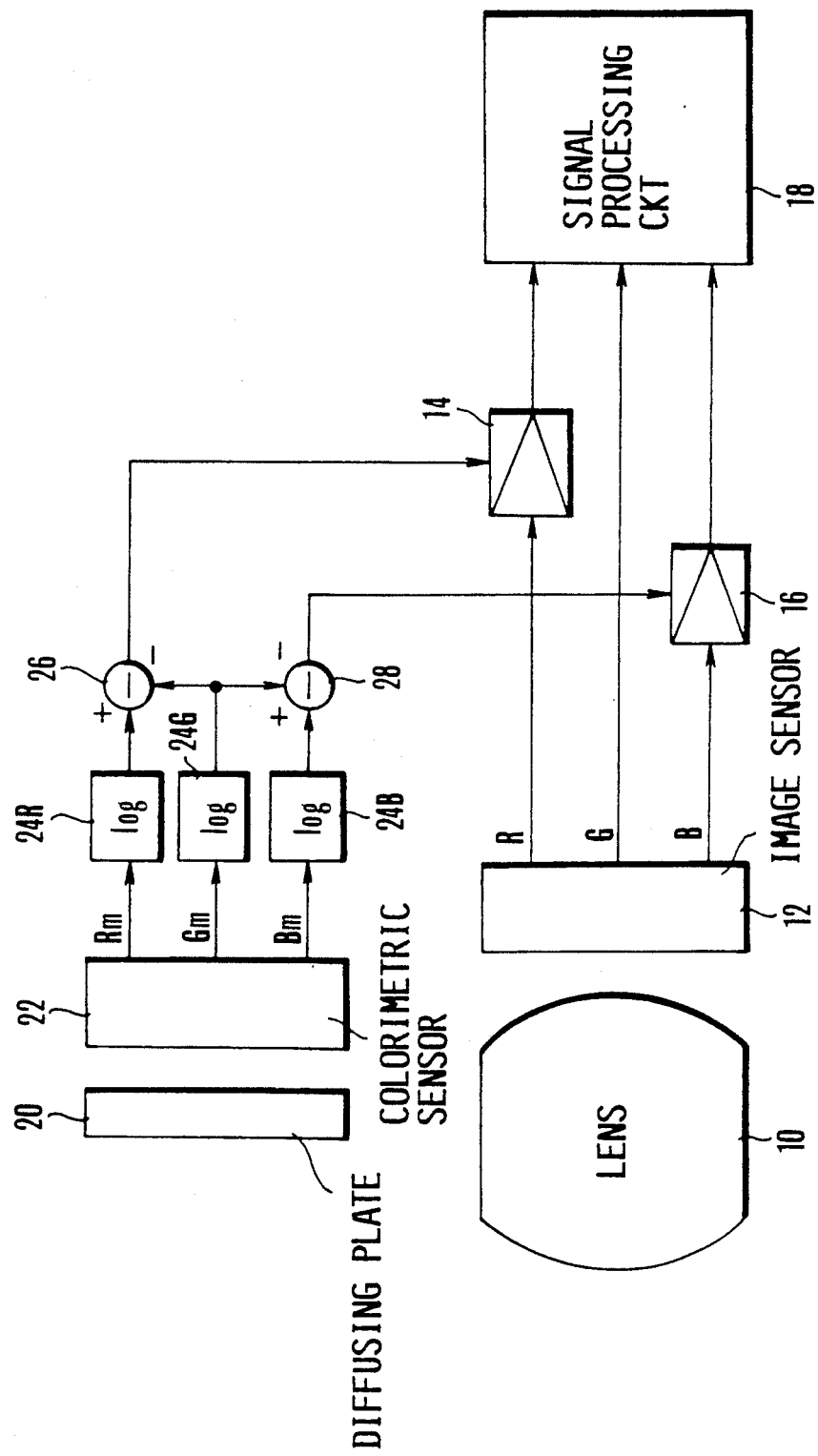
FIGS. 1 to 4 are block diagrams respectively showing the arrangement of image sensing apparatuses using the conventional white balance correction circuits of varied kinds.
Figure 2:
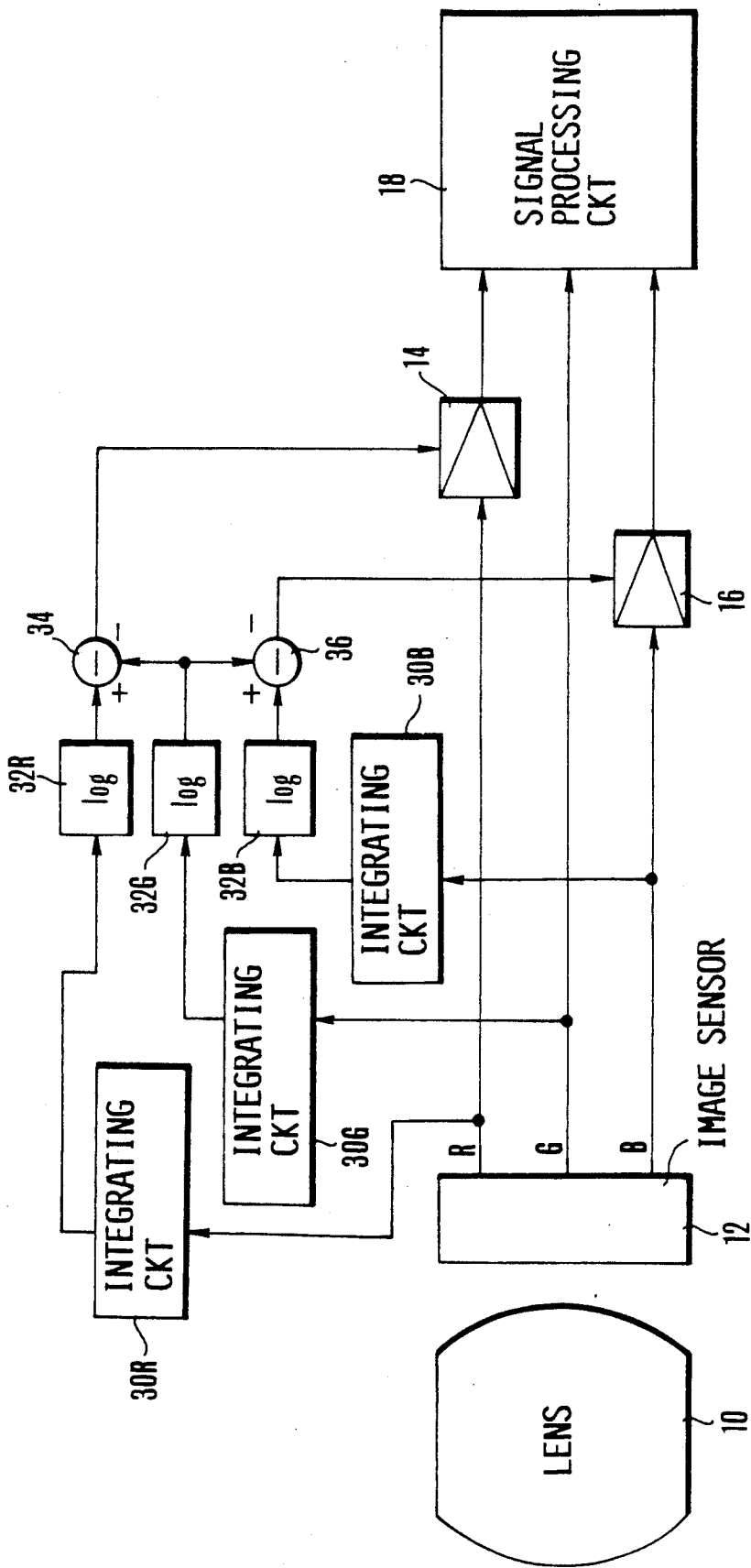
Figure 5:
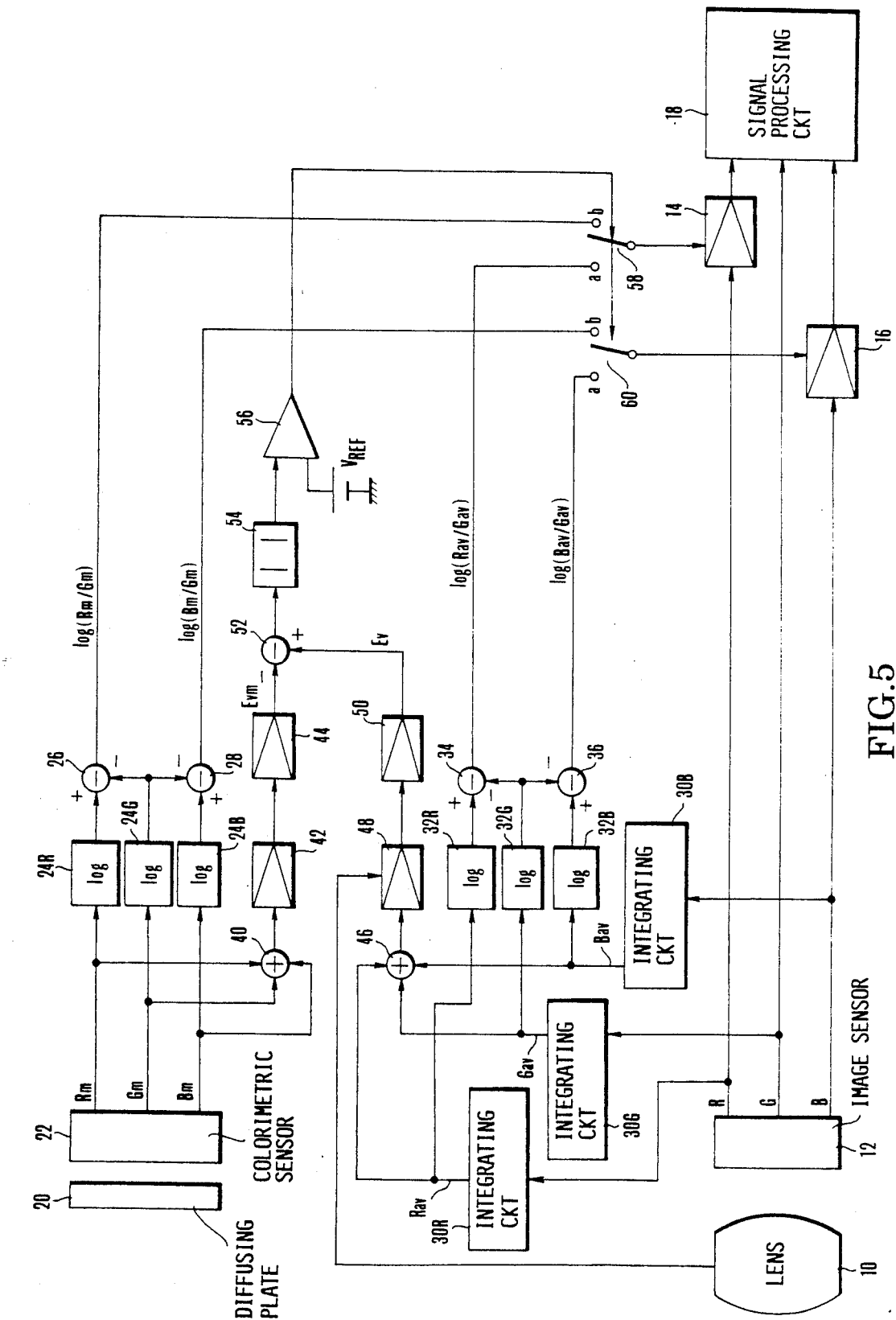
FIGS. 5 to 7 are block diagrams respectively showing the arrangement of image sensing apparatuses which incorporate therein white balance correction circuits according to this invention as first, second and third embodiments thereof.

Embodiments of this invention are described below with reference to the accompanying drawings:

FIG. 5 is a block diagram showing the arrangement of an image sensing apparatus incorporating therein a white balance correction circuit according to this invention as a first embodiment thereof. In FIG. 5, the same component parts as those of FIGS. 1 and 2 are indicated by the same reference numerals. Amplifiers 14 and 16 are arranged to have their gains controlled by a control system which includes a part consisting of a diffusing plate 20, a colorimetric sensor 22, logarithmic compression circuits 24R, 24G and 24B and subtracters 26 and 28 and arranged in the same manner as in the case of FIG. 1, and a part consisting of integrating circuits 30R, 30G and 30B, logarithmic compression circuits 32R, 32G and 32B and subtracters 34 and 36 and arranged in the same manner as in the case of FIG. 2.

An adder 40 is arranged to add together the outputs R, G and B of the colorimetric sensor 22. A coefficient amplifier 42 is arranged to multiply the output of the colorimetric sensor 40 by a predetermined coefficient. A reference numeral 44 denotes a logarithmic amplifier. An adder 46 is arranged to add together the outputs of the integrating circuits 30R, 30G and 30B. A variable gain amplifier 48 is arranged to have the gain thereof variable according to the aperture value of a photo-taking lens 10. A numeral 50 denotes another logarithmic amplifier. A subtracter 52 is arranged to subtract the output of the logarithmic amplifier 44 from the output of the logarithmic amplifier 50. An absolute value circuit 54 is arranged to obtain the absolute value of the output of the subtracter 52. A comparison circuit 56 is arranged to compare the output of the absolute value circuit 54 with a predetermined value $V_{REF}$. Switches 58 and 60 change their connecting positions according to the output of the comparison circuit 56. The switch 58 is arranged to allow the output of either the subtracter 26 or that of the subtracter 34 to be supplied to the gain control terminal of the variable gain amplifier 14. The switch 60 is arranged to allow the output of either the subtracter 28 or that of the subtracter 36 to be supplied to the gain control terminal of the variable gain amplifier 16.

The first embodiment which is arranged as shown in FIG. 5 operates as follows: The subtracter 26 produces an output log(Rm/Gm) and the subtracter 28 an output log(Bm/Gm) in the same manner as described in the foregoing with reference to FIG. 1. Assuming that the outputs of the integrating circuits 30R, 30G and 30B are expressed as Rav, Gav and Bav respectively, the subtracter 34 produces an output log(Rav/Gav) and the subtracter 36 an output log(Bav/Gav) as mentioned in the foregoing with reference to FIG. 2.

The adder 40 adds together the outputs Rm, Gm and Bm of the colorimetric sensor 22 and supplies its output to the coefficient amplifier 42. The gain of the coefficient amplifier 42 is determined according to the aperture value of the diffusing plate 20 and a difference in sensitivity between the colorimetric sensor 22 and the image sensor 12. The output of the coefficient amplifier 42 is logarithmically compressed by the logarithmic amplifier 44 and is thus formed into an illuminance signal. The output of the logarithmic amplifier 44 is assumed to be Evm as brightness information. The adder 46 adds together the outputs of the integrating circuits 30R, 30G and 30B. The adder 46 supplies its output via the variable gain amplifier 48 to the logarithmic amplifier 50 as another illuminance signal. The output of the logarithmic amplifier 50 is assumed to be Ev as brightness information.

It should be noted that the brightness information Evm and Ev may be formed by using parts of outputs of the colorimetric sensor 22 and the image sensor 12, respectively, and the invention is not limited to the embodiment thereof.

The illuminance signals Ev and Evm which are obtained in the above-stated manner are supplied to the subtracter 52. The subtracter 52 obtains a difference between the illuminance signals Ev and Evm. The absolute value circuit 54 obtains the absolute value of the output of the subtracter 52. The output $|Ev-Evm|$ of the absolute value circuit 54 thus obtained is supplied to the comparison circuit 56 to be compared with a reference voltage $V_{REF}$. If the output $|Ev-Evm|$ is greater than the reference voltage $V_{REF}$, the positions of the switches 58 and 60 are shifted to their contacts "a" which are on the sides of the subtracters 34 and 36, respectively. This allows the outputs log(Rav/Gav) and log(Bav/Gav) of the subtracters 34 and 36 to be supplied to the gain control terminals of the amplifiers 14 and 16, respectively. In a case where the output $|Ev-Evm|$ of the absolute value circuit 54 is less than the reference voltage $V_{REF}$, the connecting positions of the switches 58 and 60 are shifted to other contacts "b" thereof disposed respectively on the sides of the subtracters 26 and 28. As a result, the outputs log(Rm/Gm) and log(Bm/Gm) of the subtracters 26 and 28 are allowed to be supplied to the gain control terminals of the amplifier 14 and 16, respectively.

In a case where the difference between the illuminance signal Evm obtained by the colorimetric sensor 22 provided for white balance correction and the illuminance signal Ev obtained by the image sensor 12 provided for photographing is found to be greater than the predetermined reference value $V_{REF}$, the white balance correction is carried out by using the signal output from the image sensor 12. If the difference is found to be less than the reference value $V_{REF}$, the white balance correction is carried out by using the signal output from the colorimetric sensor 22. The first embodiment is thus arranged to be capable of appropriately carrying out white balance correction according to the illuminated conditions of the object and the camera.

Figure 6:
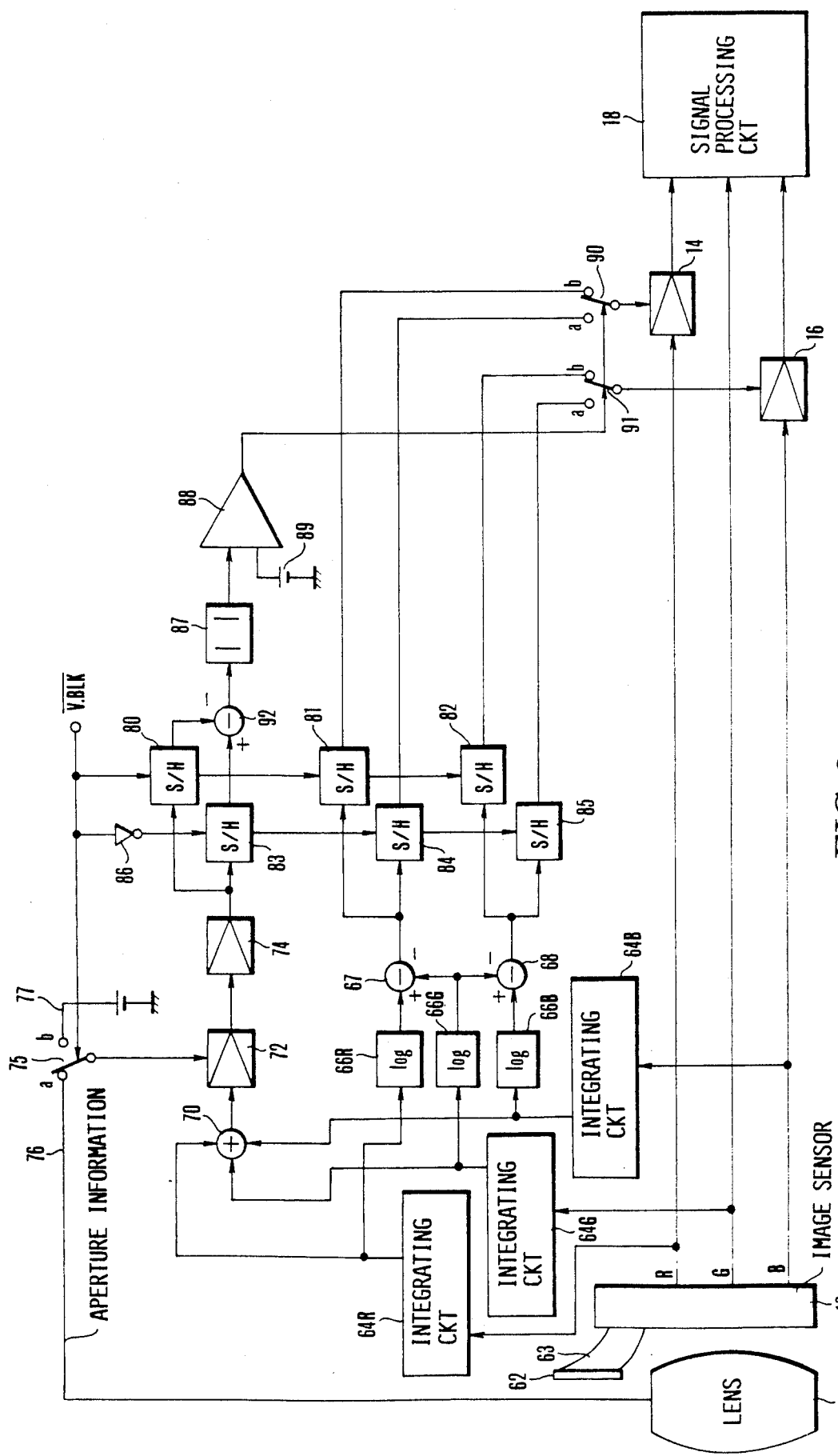

FIG. 6 is a block diagram showing the arrangement of a second embodiment of the invention. In the case of the second embodiment, a part of the image sensor provided for photographing is arranged to be used for the color measuring purpose. Compared with the conventional image sensor 12, an image sensor 13 of the second embodiment has a photosensitive surface thereof arranged to be longer and extended to an extent corresponding to several lines. A signal obtained from this extension part is arranged to be read out, for example, during a vertical blanking period. The light passing through the diffusing plate 20 is guided by a colorimetric optical system 63 to the above-stated extension part (hereinafter refereed to as color measuring area). The part of the image sensor 12 from which an image signal obtained by a photographing operation is to be read out is called an image sensing area. In the case of this specific embodiment, a signal is read out from the color measuring area during a vertical blanking period. The signal of the image sensing area is read out during a normal image sensing period other than the vertical blanking period.

The white balance correction signal forming operation of the embodiment is as follows: The outputs R, G and B of the image sensor 13 obtained from both the color measuring area and the image sensing area are supplied to integrating circuits 64R, 64G and 64B. Each of the integrating circuits 64R, 64G and 64B integrates the output R, G or B for a predetermined period and produces a mean value signal. Then, as mentioned in the foregoing, a circuit which consists of logarithmic compression circuits 66S, 66G and 66B and subtracters 67 and 68 forms signals log(R/G) and log(B/G) from the outputs of the integrating circuits 64R, 64G and 64B. Further, an adder 70 adds together the outputs of the integrating circuits 64R, 64G and 64B. The output of the adder 70 is converted into an illuminance signal Ev through a variable gain amplifier 72 and a logarithmic amplifier 74. The gain of the variable gain amplifier 72 is controlled by selecting either an aperture information signal 76 indicative of the aperture of a photo-taking lens 10 or a signal 77 indicative of the aperture value of the colorimetric optical system 63 through a switch 75 according to a vertical blanking signal. IN other words, the connecting position of the switch 75 is on the side of one contact "a" thereof during the image sensing period and on the side of another contact "b" during the vertical blanking period.

With the gain of the amplifier 72 controlled in this manner, the logarithmic amplifier 74 produces at the end of the image sensing period an illuminance signal obtained from the image sensing area (object illuminance) and, at the end of the vertical blanking period, an illuminance signal obtained from the color measuring area (illuminance of the diffusing plate 62). The subtracters 67 and 68 likewise produce at the end of the image sensing period a white balance correcting signal obtained form the image sensing area, at the end of the vertical blanking period, a white balance correction signal obtained from the color measuring area.

Sample-and-hold (S/H) circuits 80, 81 and 82 operate in response to the vertical blanking signal to sample the output (illuminance signal) of the logarithmic amplifier 74, the output log(R/G) of the subtracter 67 and the output log(B/G) of the subtracter 68 and hold them during the image sensing period, respectively. Meanwhile, S/H circuits 83, 84 and 85 operate in response to a signal obtained by inverting the vertical blanking signal by means of an inverter 86. They sample the outputs of the logarithmic amplifier 74 and the subtracters 67 and 68 and hold the sampled outputs during the vertical blanking period, respectively.

A subtracter 92 obtains a difference between the outputs of the S/H circuits 80 and 83. The absolute value of the difference is obtained by an absolute value circuit 87. A comparison circuit 88 compares the output of the absolute value circuit 87 with a predetermined value 89. Switches 90 and 91 are controlled on the basis of the result of the comparison made by the comparison circuit 88. If the difference between the illuminance of the object and the illuminance of the diffusing plate 62 is found to be small through the comparison made by the comparison circuit 88, the connecting positions of the switches 90 and 91 are set on the sides of their contacts "b" to cause the outputs of the S/H circuits 81 and 82 to be supplied to the gain control terminals of the amplifiers 14 and 16. If the illuminance difference is found to be large, the positions of the switches 90 and 91 are set on the sides of other contacts "a" of them to cause the outputs of the S/H circuits 84 and 85 to be supplied to the gain control terminals of the amplifiers 14 and 16.

Compared with the first embodiment shown in FIG. 5, the second embodiment shown in FIG. 6 has a less color measuring error by virtue of the use of the same color filter for both the image sensing system and the color measuring system. The second embodiment also permits reduction in the number of necessary circuit elements including logarithmic amplifiers, etc.

Each of the first and second embodiments is arranged to have the output of the image sensor 12 or 13 and that of the colorimetric sensor 22 processed by their own circuit elements respectively for forming the white balance correction signals. However, the arrangement may be changed to form the white balance correction signals by analog-to-digital converting these outputs and then by processing them through a digital computing process using a microcomputer.

As described in the foregoing, in each of the first and second embodiments, the use of the white balance correction signal forming circuit systems is switched from one over to the other according to a difference between the illuminance of the camera and that of the object. This enables the embodiment to carry out white balance correction always appositely to illuminating conditions.

Figure 3:
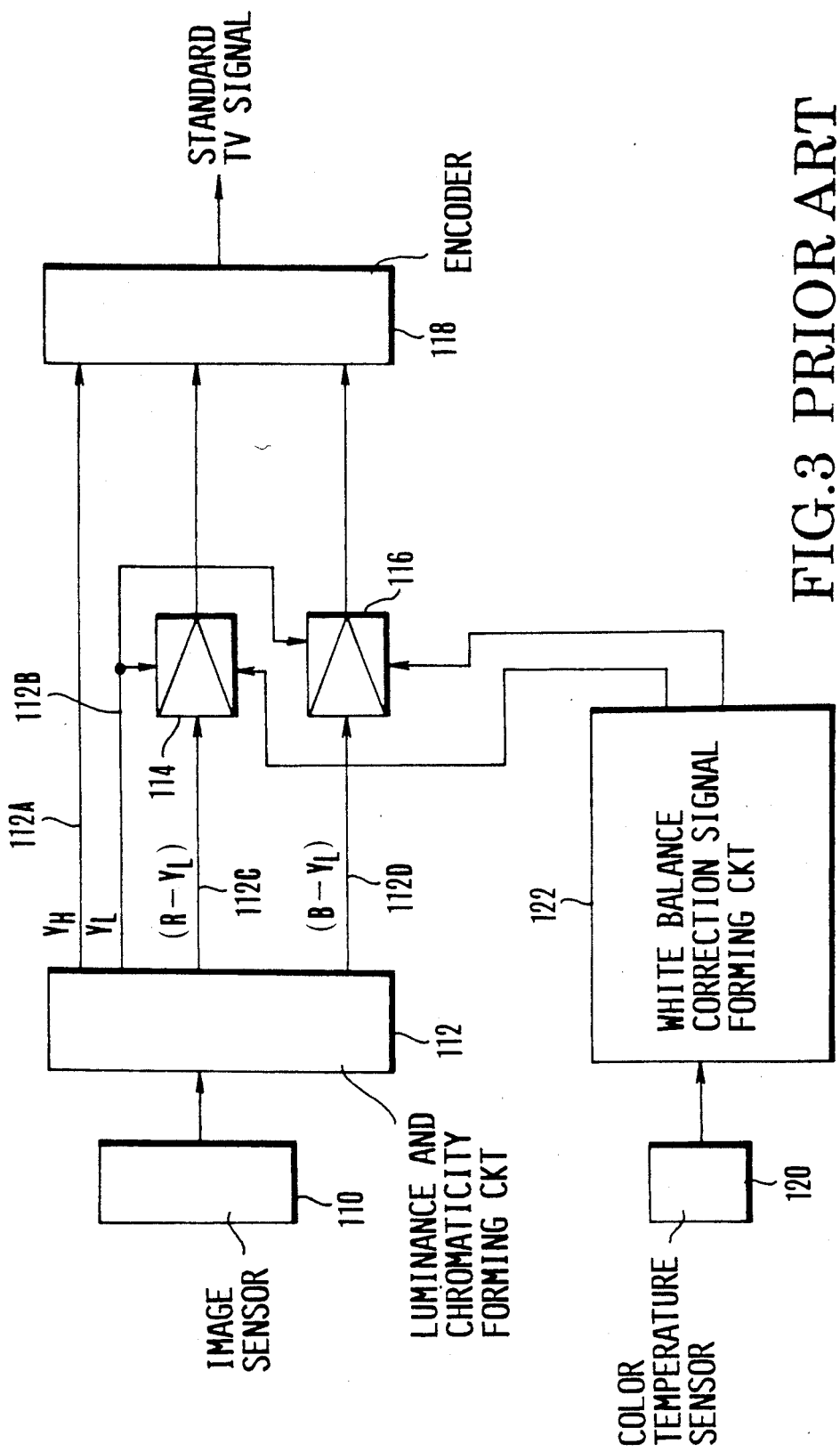
Figure 4:
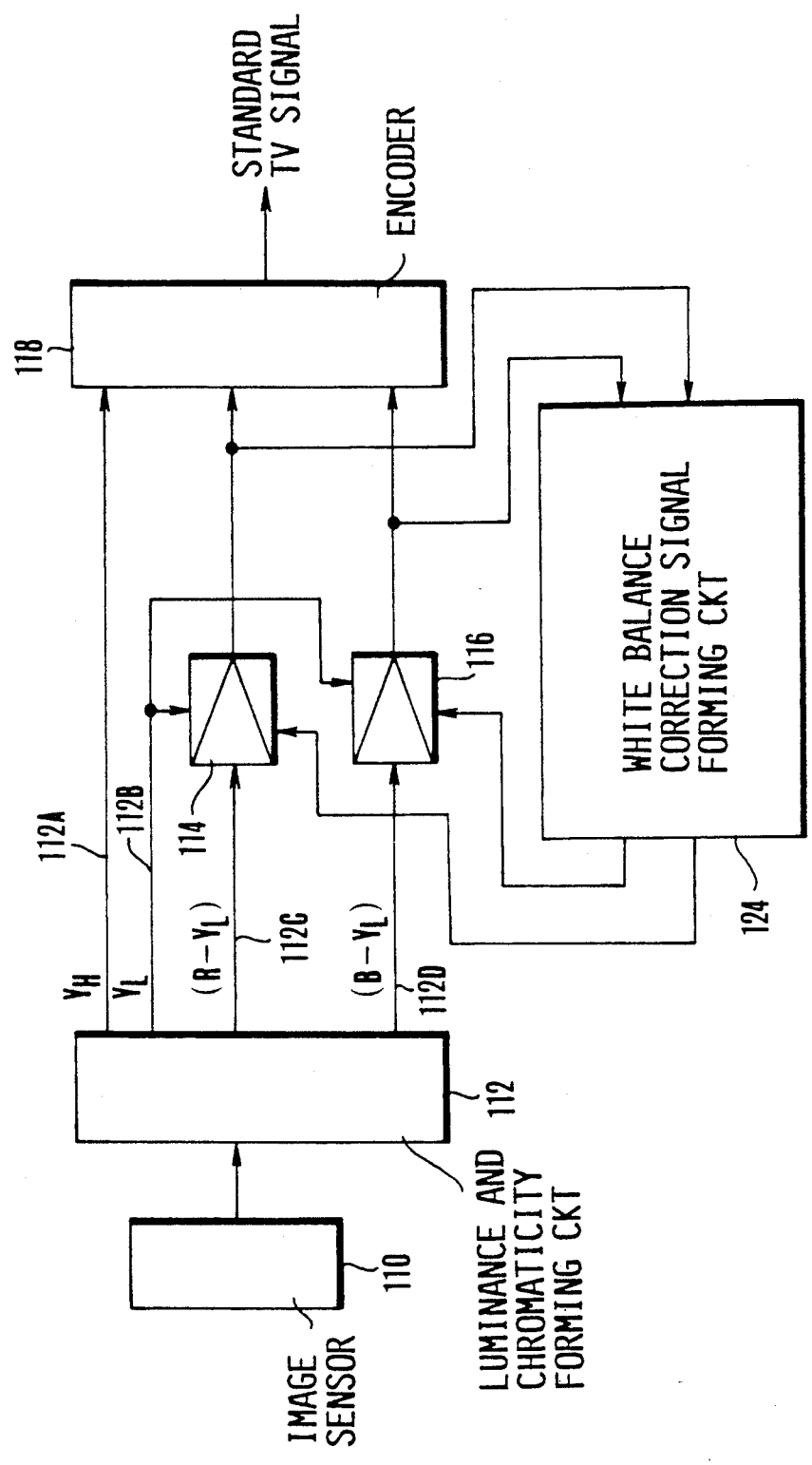
Figure 7:
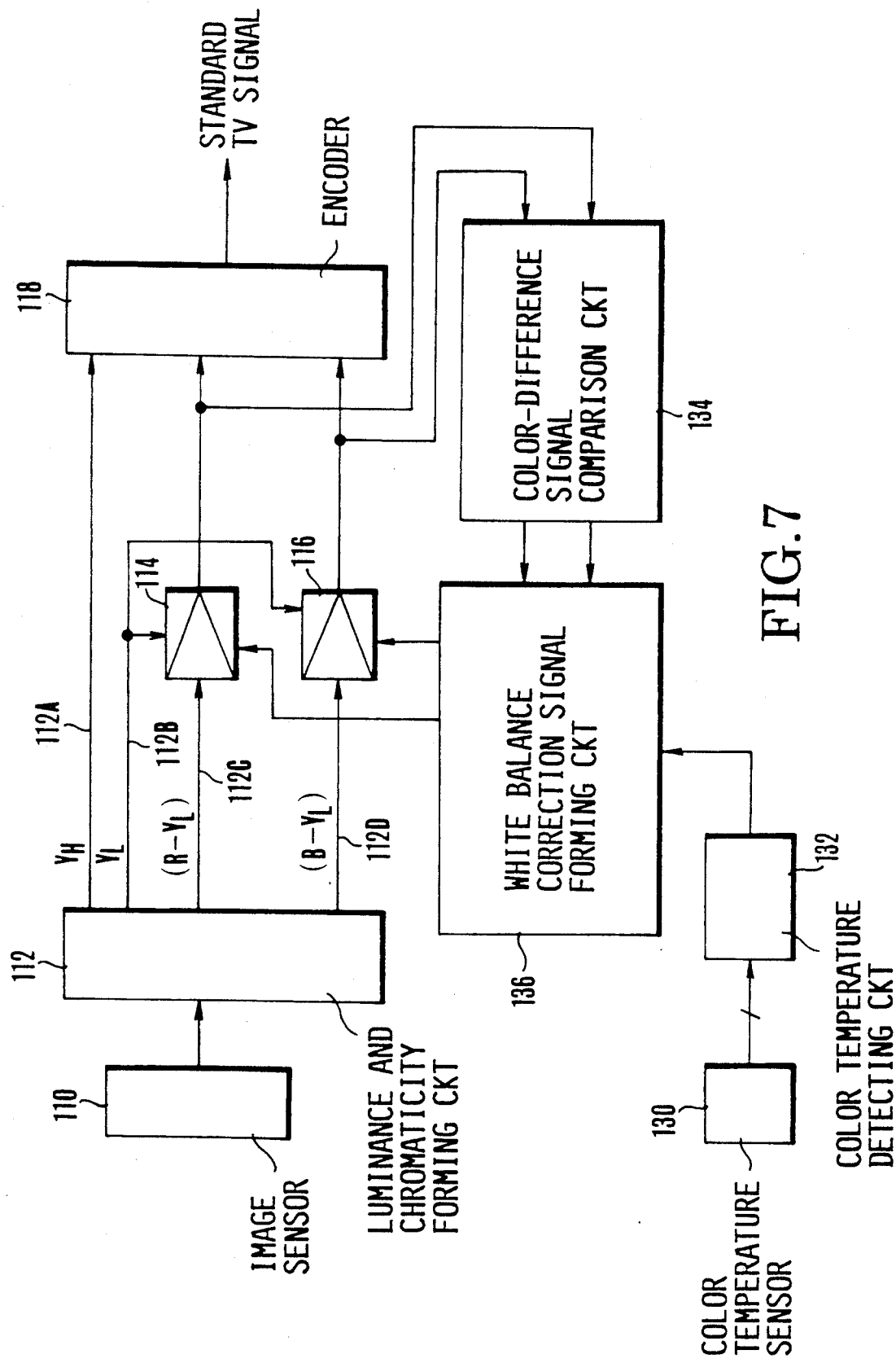

FIG. 7 shows in a block diagram the arrangement of a third embodiment of the invention. The same component parts as those of FIGS. 3 and 4 are indicated by the same reference numerals. Referring to FIG. 7, a color temperature sensor 130 consists of color filters for at least two different colors; and photo sensors, such as photo-diodes or photo-transistors or the like, which are arranged to detect the light quantities of different color components obtained by these color filters. A color temperature detecting circuit 132 is arranged to compute and obtain a light quantity signal output from the color temperature sensor 130 for each color component and to detect thereby the color temperature of light incident on the color temperature sensor 130. A color-difference signal comparison circuit 134 is arranged to compare a mean value of each of the outputs of amplifiers 114 and 116 with an achromatic color level of each of the color-difference signals and to output difference values thus obtained. A white balance correction signal forming circuit 136 is arranged to form white balance correction signals according to a color temperature detected by a color temperature detecting circuit 132 and the outputs of the color-difference signal comparison circuit 134. The amplifiers 114 and 116 are arranged to operate under the control of the white balance correction signals output from the white balance correction signal forming circuit 136.

The third embodiment shown in FIG. 7 operates as follows: Like in the cases of FIGS. 3 and 4, a luminance and chromaticity forming circuit 112 forms and outputs luminance signals $Y_H$ and $Y_L$ and color-difference signals $(R-Y_L)$ and $(B-Y_L)$ The color-difference signals are then respectively supplied to the amplifiers 114 and 116. Then, in accordance with the white balance correction signals output from the white balance correction signal forming circuit 136, the amplifiers 114 and 116 perform white balance correcting actions on the color-difference signals. The outputs of the amplifiers 114 and 116 are then supplied to an encoder 118 and the color-difference signal comparison circuits 134. The encoder 118 then forms a standard TV signal in the same manner as in the case of the conventional arrangement examples described in the foregoing.

The color-difference signal comparison circuit 134 compares a mean value of each of the color-difference signals $(R-Y_L)$ and $(B-Y_L)$ output from the amplifiers 114 and 116 with an achromatic color level of each of the color-difference signals to obtain differences between the mean values and the achromatic color levels. Then, signals representing these differences are output from the circuit 134 and supplied to the white balance correction signal forming circuit 136. Meanwhile, the color temperature sensor 130 produces signals representing a plurality of color components of ambient light. The color temperature detecting circuit 132 then determines the color temperature of the ambient light from the output of the color temperature sensor 130.

The white balance correction signal forming circuit 136 forms a white balance correction signal solely on the basis of a color temperature signal output from the color temperature detecting circuit 132 gwen the color-difference signal comparison circuit 134 outputs a signal indicative of no difference (zero difference); and forms a white balance correction signal on the basis of both the color temperature signal output form the color temperature detecting circuit 132 and the output of the color difference signal comparison circuit 134 if the difference indicated by the signal output from the color-difference signal comparison circuit 134 is not zero, that is, if the color saturation level is high. The white balance correction signals which are formed in this manner are supplied to the amplifiers 114 and 116. Upon receipt of the white balance correction signals, the amplifiers 114 and 116 add or subtract as applicable the low-band luminance signal $Y_L$ to or from the color-difference signals $(R-Y_L)$ and $(B-Y_L)$. As a result, white-balance-corrected color-difference signals are output from the amplifiers 114 and 116, respectively.

In the case of the third embodiment shown in FIG. 7, the white balance correction is arranged to be accomplished by adding or subtracting the low-band luminance signal $Y_L$ to or from the color-difference signals $(R-Y_L)$ and $(B-Y_L)$. However, in accordance with this invention, this arrangement of course may be replaced with any generally known arrangement, such as a method of controlling the amplification gain of the signals R and B. As regards the signals to be compared by the color-difference signal comparison circuit 134, the circuit 134 may be arranged to perform the comparing action on signals obtained through some computation performed between the color-difference signals or on signals obtained after removal of some abnormal part (such as a high luminance part (from each of the color-difference signals.

As apparent from the above description, the third embodiment is capable of making accurately controlled white balance correction with the ambient light duly taken into consideration.

What is claimed is:

1. An image sensing apparatus comprising:
   a) first control signal forming means for forming a first control signal for controlling color balance on the basis of an output of a colorimetric sensor;
   b) second control signal forming means for forming a second control signal for controlling color balance on the basis of an output of color image sensing means;
   c) comparing means for comparing a first brightness signal obtained from said colorimetric sensor and a second brightness signal obtained from said image sensing means;
   d) selection means for selecting one of said first and second control signals in accordance with a result of comparison effected by said comparing means; and
   e) said color image sensing means for producing an image signal having a color balance controlled in accordance with said first or second control signal selected by said selection means.

2. An apparatus according to claim 1, wherein said selection means includes brightness detecting means for detecting the brightness of the object.

3. An apparatus according to claim 2, wherein said brightness detecting means is arranged to detect the brightness of the object by using a part of the output of said colorimetric sensor.

4. An apparatus according to claim 2 or 3, wherein said brightness detecting means is arranged to detect the brightness of the object by using a part of the output of said color image sensing means.

5. An apparatus according to claim 1, wherein said selection means includes color saturation detecting means for detecting the color saturation of the object, and said selection means is arranged to select at least one of said first and second control signals, in accordance with the color saturation level detected by said saturation detecting means.

6. An apparatus according to claim 5, wherein said saturation detecting means is arranged to detect the color saturation of the object by using a part of the output of said color image sensing means.

7. An apparatus according to claim 6, wherein said saturation detecting means is arranged to detect the color saturation of the object by using a level of a color-difference signal included in the output of said color image sensing means.

8. An apparatus according to claim 1, wherein said color image sensing means has a variable gain amplifier for relatively controlling gains of color signals included in the image signal to control color balance.

9. An apparatus according to claim 1, wherein said color image sensing means includes mixing ratio control means for controlling, for color balance control, a mixing ratio in which color-difference signals and a luminance signal included in the image signal are mixed with each other.

10. An apparatus according to claim 1, wherein said selection means is arranged to select one of said first and second control signals by variably controlling a mixing ratio between said first and second control signals.

11. An apparatus according to claim 1, further comprising means for controlling color balance by using both said first and second control signals.

12. An image sensing apparatus, comprising:
a) color image pickup means for forming a color image signal from an image of an object;
b) first means for forming a brightness information of the object on the basis of said color image signal;
c) detecting means for detecting a color temperature of ambient light, said detecting means being provided separately from said color image pickup means;
d) second means for forming a brightness information of the object from an output of said detecting means;
e) computing means for computing the brightness informations formed by said first and second means; and
f) control means for controlling a white balance of said color image signal, depending upon a result of computation effected by the computing means.

13. An apparatus according to claim 12, wherein said computing means is arranged to compare the brightness information formed by said first and second means.

14. An apparatus according to claim 12, wherein said control means includes a control mode in which the white balance is controlled on the basis of at least said color image signal.

15. An apparatus according to claim 12, wherein said control means includes a control mode in which the white balance is controlled on the basis of at least an output of said detecting means.

16. An apparatus according to claim 12, wherein said control means is arranged to control the white balance on the basis of at least one of said image signal and the output of said detecting means.

17. An apparatus according to claim 16, wherein said control means is arranged to control the white balance on the basis of said image signal when there is a large difference between the brightness information formed by said first means and the brightness information formed by said second means.

18. An apparatus according to claim 16 or 17, wherein said control means is arranged to control the white balance on the basis of the output of said detecting means when there is a small difference between the brightness information formed by said first means and the brightness information formed by said second means.

19. An image sensing apparatus, comprising:
a) color image pickup means for forming a color image signal from an image of an object;
b) color saturation signal forming means for forming a color saturation signal from said color image signal;
c) detecting means for detecting a color temperature of ambient light, said detecting means being provided separately from said color image pickup means; and
d) control means for controlling a white balance of said color image signal, by using an output of said detecting means, depending upon the color saturation signal formed by said color saturation signal forming means.

20. An apparatus according to claim 19, wherein the control means is further arranged to control the white balance of the color image signal, by using the color image signal.

21. An apparatus according to claim 19, wherein the color saturation signal forming means includes means for forming a color difference signal from said color image signal.

22. An image sensing apparatus, comprising:
a) color image pickup means for forming a color image signal from an image of an object;
b) brightness detecting means for detecting a brightness of an object;
c) detecting means for detecting a color temperature of ambient light, said detecting means being provided separately from said color image pickup means; and
d) control means for controlling a white balance of the color image signal, by selectively using one of said color image signal and the output of said detecting means, depending upon the output of said brightness detecting means.

23. An apparatus according to claim 22, wherein said brightness detecting means includes first means for forming a brightness information of the object on the basis of said color image signal.

24. An apparatus according to claim 23, wherein said brightness detecting means further includes second means for forming a brightness information of the object from an output of said detecting means.

25. An apparatus according to claim 24, wherein said brightness detecting means includes computing means for computing the brightness informations formed by said first and second means.

26. An apparatus according to claim 25, wherein said control means is arranged to control the white balance of said color image signal, depending upon a result of computation effected by the computing means.

27. An apparatus according to claim 22, wherein said brightness detecting means further includes second means for forming a brightness information of the object from an output of said detecting means.

* * * * *